March 26, 1968     L. W. HESTER     3,374,955
FLOW DISTRIBUTOR ATTACHMENT FOR IRRIGATION FLOW WAYS
Filed Jan. 10, 1966
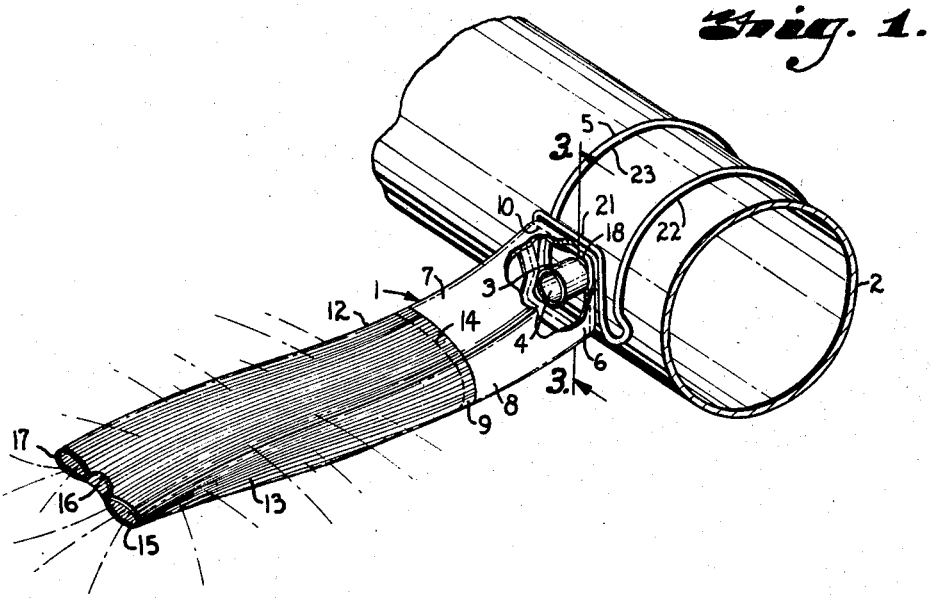
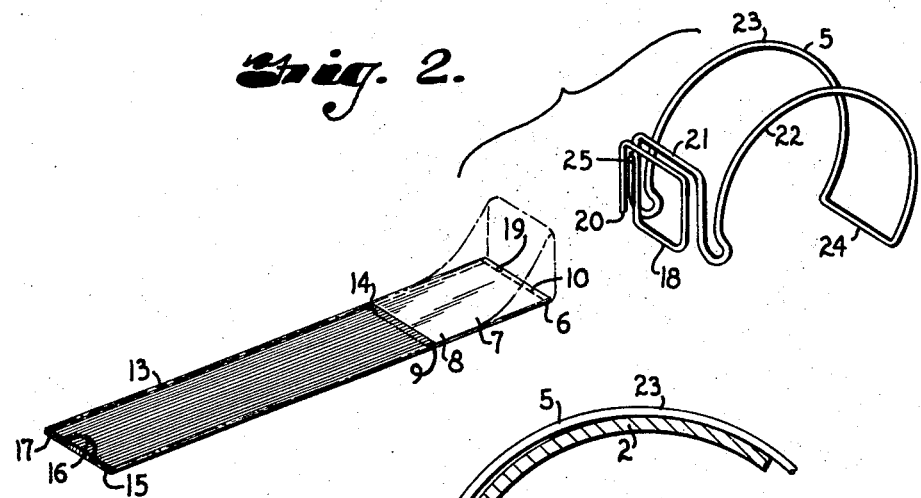
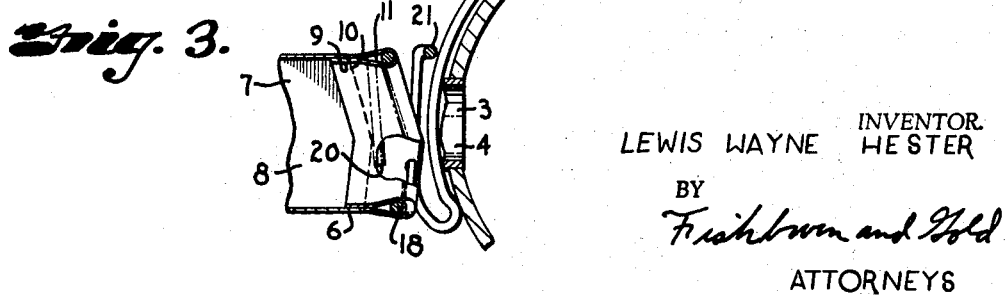
INVENTOR.
LEWIS WAYNE HESTER
BY
ATTORNEYS

United States Patent Office 3,374,955
Patented Mar. 26, 1968

3,374,955
FLOW DISTRIBUTOR ATTACHMENT FOR
IRRIGATION FLOW WAYS
Lewis Wayne Hester, Sublette, Kans., assignor to Anadarko Production Company, Liberal, Kans., a corporation of Delaware
Filed Jan. 10, 1966, Ser. No. 519,670
2 Claims. (Cl. 239—145)

ABSTRACT OF THE DISCLOSURE

A flow distributor for use in an irrigation system having a flow way connected to a source of water and discharge openings directed laterally therefrom, said distributor including an elongate flexible collapsible tube with an impervious portion extending from the inlet end with the major portion an elongate foraminous tube that extends from the impervious portion to the outlet end. The distributor being supported with its inlet end surrounding the discharge opening of the flow way by a wire loop threaded into a hem of the tube at the inlet end for maintaining same in distended position with extensions on the loop forming resilient clamp means engaged with the flow way, said tube having the central portion at the outlet end connected to provide laterally spaced restricted discharge openings whereby water passes laterally through the foraminous portion at low velocity.

---

It is common practice in irrigation of crops and the like to flow water through flow ways which are provided with water outlets at spaced intervals whereby the water is directed outwardly into a row, channel or ditch for flow along the rows and through laterals for distribution around the crop in the area being irrigated. In such systems it is also common practice to have such flow ways in the form of portable pipe with gated discharges in the form of laterally extending tubular branches spaced therealong and selectively opened and closed by suitable valves or gates. When the water is discharged through such openings it is in the form of a jet or forceful flow that washes the soil and erodes the listed ridge causing water loss parallel to the flow pipe and uneven distribution to the crop rows.

The principal objects of the present invention are to provide a structure which eliminates the erosion difficulty above described; to provide a flow distributor at the row outlet of the pipe dampening the flooding effect so that the water is discharged to the crop row with a minimum of erosion of the listed ridge; to provide such a flow distributor that is removably attached to the pipe; to provide such a flow distributor in the form of an elongate mesh tube with an impervious portion connected to a clamp whereby when the clamp is placed on the pipe the impervious portion defines an inlet surrounding the discharge opening for the respective crop row; and to provide a flow distributor that is economical to manufacture and easily and quickly applied to the irrigation pipe at a gated outlet whereby the water escapes in a dissipated form for substantially no ridge erosion at the crop row.

Other objects and advantages of this invention will become apparent from the following description taken in connection with the accompanying drawings wherein are set forth by way of illustration and example certain embodiments of this invention.

FIG. 1 is a perspective view of a flow distributor embodying the features of the present invention attached to an irrigation pipe at an outlet thereof.

FIG. 2 is a disassembled perspective view of the distributor tube and mounting member.

FIG. 3 is an enlarged partial sectional view through the distributor and irrigation pipe.

Referring more in detail to the drawings:

The reference numeral 1 generally designates a flow distributor for irrigation flow ways such as a pipe 2 connected to a source not shown of pressurized water and having laterally gated discharge outlets 3. The pipes 2 are usually arranged at the end of a plurality of parallel crop rows formed by listed ridges which define flow channels for gravity flow of water along the respective rows when introduced at the higher end. The pipes 2 are arranged at the higher elevation of the rows and an outlet 3 positioned to direct flow along the row whereby when the outlet is opened the water is discharged down the row between the ridges. In the illustrated structure the outlet 3 of the pipe is defined by a tubular branch 4 extending laterally from the pipe 2.

The distributor 1 includes a mounting or support member 5 connected to an inlet end 6 of an elongate flow distributor or diffuser 7 with the inlet end of such size or distended to surround the branch member 4. The elongate distributor member 7, which may also be called a sock, has a portion 8 adjacent the inlet end 6 of flexible long wearing material such as heavy duty canvas, said portion 8 at the inlet end having a margin or portion 9 turned rearwardly and connected to the body as by stitching 10 to form a hem that defines a loop 11 that extends circumferentially of the inlet end 6 of the distributor. The other or downstream end 12 of the portion 8 is secured to a tubular flexible foraminous member 13 as by stitching 14 whereby the member 13 forms an extension of the inlet portion 8.

The foraminous tubular member 13 has small pores or openings therein and the length of the member 13 is such that all of the water flowing therethrough may be dissipated through the pores or openings in a flow having an absence of any jetting action. It is preferred that the inlet portion 8 and the foraminous portion 13 be of substantially uniform transverse dimensions with the foraminous member having an open discharge end 15 that is partially restricted by flattening the outlet portion whereby the opposed wall portions are in overlying relation and then the central portion is connected as by stitching 16 so that the open discharge end has laterally spaced restricted openings 17. This assures a substantial portion of the water will be discharged laterally outwardly through the pores of the foraminous walls with little flow velocity whereby there is substantially no erosion of the listed ridges of the row on each side of the foraminous member. The discharge end can be enlarged or further restricted from that shown depending upon the use and soil conditions.

While any suitable foraminous material may be utilized for the member or portion 13 it is preferred that a flexible plastic mesh be used for long life and ease of handling. It is preferred that the mesh have openings in the nature of $\frac{1}{16}$ to $\frac{1}{8}$ of an inch, however, the openings may be smaller and the diffusing portion of the sock increased in length to obtain suitable dissipation of the water at a velocity with no erosion. The water distributor is only needed when water is going to be delivered through a pipe discharge opening or outlet 3 to the respective row of crops therefore it is preferred that the connection of the distributor to the pipe 2 be removable so the distributor can be moved from one outlet to another. Also, the mounting structure or clamp to engage the pipe is adjustable to accommodate different size pipe.

The inlet end 6 of the distributor 1 has a frame member 18 inside the hem or loop 11 to hold the inlet end in distended relation whereby it may be placed in surrounding relation to the outlet or branch member 4. It is preferred that the frame 18 be connected to the clamp or mounting member 5 for holding the distributor to the pipe. In the structure illustrated both the frame 18 and the clamp 5 are formed of wire whereby the clamp portion 5 is resilient and will expand to accommodate different size pipes. The inlet portion or hem 11 of the tube has an opening 19 to the passage in the hem to provide an inlet opening for a free end 20 of the wire frame 18. With this arrangement the end 20 is inserted into the opening 19 and the hem threaded onto the wire frame to distend the inlet opening. In the structure illustrated the wire frame 18 is bent to substantially a square shape and is connected to one end of an inverted U-shaped portion 21 of the clamp member 5. In the illustrated structure the frame and portion 21 form a connector for spaced circular segments 22 and 23 connected on the opposite ends by a bar 24 to complete the resilient clamp. The terminal end portion of the segment 23 adjacent the U-shaped member 21 is turned upwardly and secured as by welding at 25 to one leg of the U-member 21. With this arrangement the U-shaped member 21 and bar 24 provide connectors to maintain the grip or clamp portions 22 and 23 in spaced relation and also supports the frame 18 whereby it can be easily moved to position the inlet 5 of the distributor in alignment and surrounding relation with the outlet portion 4 and the bar portion moved over the pipe 2 to resiliently clamp same and hold the distributor in place.

With the distributor mounted on the pipe in this arrangement, water issuing from the outlet is directed through the distributor that lays along the respective crop rows between the listed ridges and delivers the water thereto with substantially no erosion. After sufficient water has been flowed in one row the discharge is turned off and by grasping the bar 24 the clamp member is pulled from the pipe and moved laterally outwardly from the outlet 4 to effect separation so that the distributor can be moved to another outlet.

It is to be understood that while I have illustrated and described one form of my invention it is not to be limited to the specific form or arrangement of parts herein described and shown except insofar as such limitations are included in the claims.

What I claim and desire to secure by Letters Patent is:

1. In an irrigation system having a flow way connected to a source of water with said flow way having discharge openings directed laterally therefrom,
    (a) an elongate flexible collapsible tube having an inlet end and an outlet end, said tube having an elongate substantially impervious portion extending from said inlet end and a major portion of foraminous plastic mesh secured to the impervious portion to receive water therefrom and extending to the outlet end of said tube, said mesh permitting water to pass laterally therethrough at low velocity, said tube having a hem at the inlet end with an opening through a wall thereof for entry into said hem,
    (b) means at the inlet end of the tube retaining said inlet end in distended relation forming an opening for positioning in surrounding relation to the discharge opening of a flow way, said means including a rigid open-ended wire loop member threaded into said hem and extending around the inlet end, said wire loop member having an integral portion in the form of an inverted U exteriorly of the hem,
    (c) means on said integral portion and secured to said flow way at a discharge opening thereof for retaining said tube inlet end in position whereby water from said discharge opening flows into the elongate tube for distribution thereby, said securing means being a resilient arcuate clamp member removably engaged with said flow way,
    (d) means connecting central portions of the outlet end of the tube and holding same to provide laterally spaced restricted outlet openings at said outlet end whereby the water passes laterally outwardly through the mesh of the tube.

2. A flow distributor for an irrigation system as set forth in claim 1 wherein the rigid member and the clamp member are portions of a continuous wire with said clamp member having laterally spaced arcuate portions connected at the ends thereof spaced from the rigid member.

References Cited

UNITED STATES PATENTS

| | | | |
|---|---|---|---|
| 2,174,600 | 10/1939 | Schutmaat | 239—145 |
| 2,940,777 | 6/1960 | Lundberg | 285—5 |
| 3,050,801 | 8/1962 | Downey | 285—5 |
| 3,233,627 | 2/1966 | Cebula | 285—5 |
| 3,304,590 | 2/1967 | Bremenkamp | 285—5 |

M. HENSON WOOD, Jr., *Primary Examiner.*

H. NATTER, *Assistant Examiner.*

UNITED STATES PATENT OFFICE
CERTIFICATE OF CORRECTION

Patent No. 3,374,955                                March 26, 1968

Lewis Wayne Hester

It is certified that error appears in the above identified patent and that said Letters Patent are hereby corrected as shown below:

In the heading to the printed specification, lines 4 to 6, "Lewis Wayne Hester, Sublette, Kans., assignor to Anadarko Production Company, Liberal, Kans., a corporation of Delaware" should read -- Lewis Wayne Hester, Sublette, Kans. 67877 --.

Signed and sealed this 29th day of July 1969.

(SEAL)
Attest:

Edward M. Fletcher, Jr.                        WILLIAM E. SCHUYLER, JR.
Attesting Officer                                   Commissioner of Patents